Patented Apr. 17, 1951

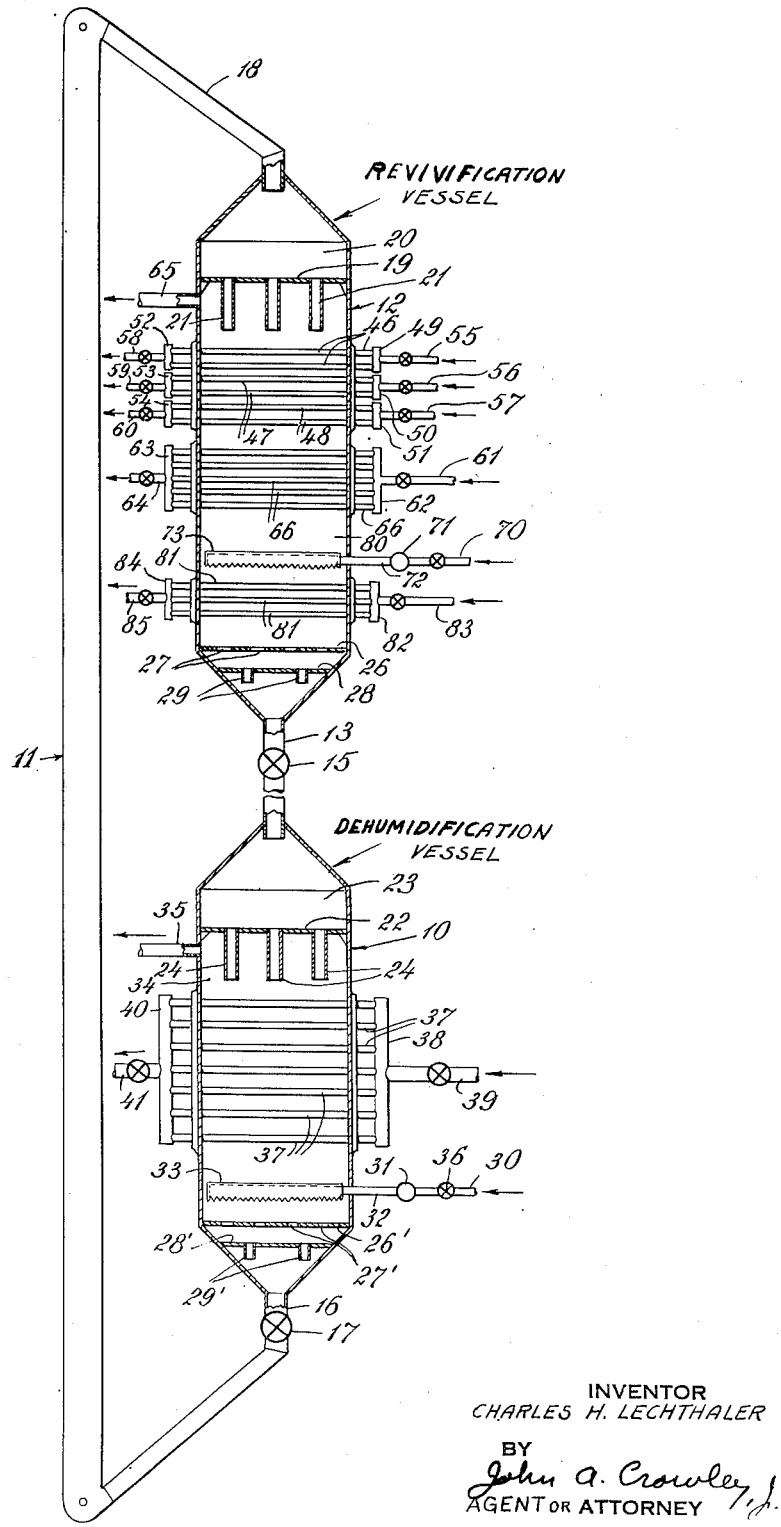

2,549,104

UNITED STATES PATENT OFFICE 2,549,104

METHOD FOR REVIVIFICATION OF DESICCANTS

Charles H. Lechthaler, Woodbury, N. J., assignor to Socony-Vacuum Oil Company, Incorporated, a corporation of New York Application June 29, 1946, Serial No. 680,377

16 Claims. (Cl. 183—114.2)

This invention is directed to a method for revivifying desiccants of gel type which have become spent by use in drying operations. Exemplary of such drying operations are the drying of air by passage thereof through beds or columns of solid, particle form desiccants; the drying of solids by mixing of wet finely divided solids with solid particle form desiccants and the removal of water from other liquids by passage of said liquids through a suitable mass of solid, particle form desiccant.

This invention is principally concerned with the revivification of inorganic oxide gels comprised predominantly of silica or in some instances alumina and having a high capacity to adsorb moisture over a wide range of relative humidities. Such gel type desiccants are in general formed by the coagulation of a hydrosol and by subsequent washing, sometimes treating and drying of the resulting hydrogels. A method for manufacture of inorganic oxide gels is described by Patrick in U. S. Patent No. 1,297,724. Recently superior bead form desiccants having improved structural strength and high moisture adsorption capacity have been made. The bead hydrogels may be made according to the bead technique described in U. S. Patent No. 2,384,946 issued September 18, 1945 to Milton M. Marisic. In preparation of improved bead desiccants, however, the formed bead hydrogels should be cooled at a rate not less than about 3° F. per minute to a temperature below that at which gelation occurred and maintained at the reduced temperature for a substantial period of time before syneresis is complete. Thereafter the hydrogel may be washed and dried. Such preferred gel desiccants of the bead type should not contain more than about 3% by weight of metal oxide, for example, of alumina. The term gel has a rather loose meaning, as presently used in the art, to designate the porous dried solid resulting from removal of water from gelatinous precipitates, hydrogels and mixtures of the two. Since this invention is peculiarly directed to desiccants consisting of the products of drying true hydrogels, a distinction must be drawn between true hydrogels and the gelatinous precipitates. In certain of its aspects the invention includes mixtures of gelatinous precipitates and hydrogels where the mixture is set to a firm body resembling a hydrogel which includes gelatinous precipitates separated from the sol before gelation. The terms "gel-type desiccant" and "inorganic oxide gel adsorbents," as used herein in describing and claiming this invention are intended to cover true hydrogels and a hydrogel and a mixture of gelatinous precipitates and hydrogels where the mixture is set to a firm body resembling a hydrogel which includes gelatinous precipitates separated from the sol before gelation but the terms are not intended to cover gelatinous precipitates, otherwise.

This invention is specifically concerned with an improved method for regenerating particle form gel-type desiccants which may range in particle size from about 2 to 100 mesh as measured by Tyler standard screen analysis, as distinguished from finely divided powdered desiccants. In many operations, it is preferable to employ particle form desiccants falling within the size range 2 to 100 mesh and preferably within the size range 4 to 8 mesh because such particle-form desiccants when arranged as a substantially compact bed or column permit the passage therethrough of the fluid to be dried at much higher rates than is permissible in the case of powdered desiccants. Such particle-form desiccants especially when in bead form, are particularly well adapted for use in continuous drying systems wherein the desiccant is passed cyclically through moisture adsorbing and desiccant revivifications zones in each of which zones the desiccant particles flow as a substantially compact bed or column.

Heretofore when such particle-form gel-type desiccants have been employed for such processes as the drying of air, it has been common practice to discard the desiccant entirely when spent and replace it with fresh desiccant. Such spent gel-type desiccants may, however, be revivified by heating to drive off the adsorbed water, and then employed again for the drying operation. When the particle-form gel-type desiccant is so used cyclically, i. e., employed first for drying some fluid, and then revivified in the absence of said fluid by heating, it has been found that there is a gradual accumulation of fines or undersized particles of desiccant which results in a gradual reduction in the capacity of the drier. For example, a column of particle form desiccant ranging in size between 4 and 8 mesh may be maintained as a column in a closed vessel wherein it is alternately employed for removal of moisture from air passed through the column, and then revivified "in situ" by heating or by a combination of heating and passing dry gas therethrough. Gradually undersized particles or fines resulting from a break down of the desiccant accumulate in the column thereby reducing the rate at which air may be passed through the drier in the air drying portion of the cycle. The fines formed also tend to plug the retaining screens in such a fixed column process, and if the process is a continuous moving column process, then the fines cause channeling of the gas and solid flow through the gas drying vessel and through the revivification vessel. Also in either type of process the gradual break down of the adsorbent particles requires frequent addition of new fresh adsorbent to the system.

A major object of this invention is the provision of an improved cyclic process for drying fluids by means of particle-form solid inorganic gel adsorbents.

A specific object of this invention is the provision of an improved method for revivifying particle-form gel-type desiccants which have become spent by moisture adsorption thereon.

A further object of this invention is the provision of a cyclic process wherein a particle-form solid gel-type desiccant may be repeatedly used for removal of moisture from moisture containing fluids and revivified for further use while limiting to a minimum the break down of the desiccant to undersized particles.

These and other objects of this invention will become apparent from the following discussion of the invention.

It has been discovered that the gradual break down of gel-type desiccant particles to undersized material during its repeated cyclic use as a desiccant and revivification occurs during the early stages of the revivification step. When a moisture laden gel-type desiccant is subjected to heating a large portion of the moisture on the desiccant is very readily and rapidly removed therefrom by evaporation. After this readily removable moisture has been evaporated, a quantity of much less readily removed moisture still remains on the desiccant. This latter moisture may be removed slowly by heating for extended periods at higher temperatures. Apparently, even when the adsorbent is heated as fast as practically possible, this less readily removable or tightly-bound moisture is not released at a rate great enough to cause substantial damage to the desiccant particles. It has been found, however, that when spent gel-type desiccants are heated at rates conventional in the prior art, the readily removable or loosely-bound moisture is released at such a high rate as to cause a gradual break down in the very fine capillary structure characteristic of gel-type desiccants, causing cracking and weakening of the physical structure of the desiccant particle. It has been further found that if the rate of heating of the desiccant be so controlled as is hereinafter disclosed, the rate of liberation of the loosely bound moisture may be so limited as to prevent the gradual break down of the desiccant particles. After this loosely bound moisture is substantially removed the additional moisture on the adsorbent may be removed to the desired extent by heating of the gel-type desiccant at a much higher rate. It should be understood that the expression "loosely bound moisture" as employed herein in describing and in claiming this invention is intended to mean that moisture which upon rapid or uncontrolled heating of the gel-type desiccant is released so readily and/or at such a rate as to cause a gradual break down of the gel-type desiccant particles ultimately resulting in the formation of undersized desiccant particles. Tightly bound moisture on the other hand is not released so readily and/or at such a rate to cause substantial damage to the gel-type desiccant particles even though said particles are very rapidly heated.

In general the amount of moisture that gel-type desiccants are capable of adsorbing will vary somewhat depending upon the particular composition and method of manufacture of the gel-type desiccant involved and upon the relative humidity of the gas being dried and upon the dehumidification temperature. The improved bead-type silica gel desiccant containing not more than 3% by weight alumina, for example, can adsorb about 45% of its weight of moisture from 80% relative humidity 70° F. air. Some improved bead-type gel desiccants of this type can adsorb even higher amounts of moisture under these conditions. The amount of moisture upon a gel-type desiccant which is loosely bound and the amount which is tightly bound also is subject to some variation depending upon the particular gel-type desiccant involved. It has been found however that in general, after gel-type desiccants have been heated at a properly controlled low rate to a temperature within the range about 275° F. to 325° F. substantially all of the loosely bound moisture has been removed. It has been found that the tightly bound moisture may be considered broadly as amounting to about 10 percent by weight of the gel-type desiccant.

It may be said that in revivifying operations, the gel-type desiccant should be heated at a slow rate until the moisture content of the gel is below about 10 percent by weight of the gel and preferably below about 8 percent by weight.

Part of this 8 to 10% by weight of tightly bound moisture may be removed by further heating of the gel-type desiccant to higher temperatures. This additional heating need not be done slowly since the tightly bound moisture will not be released in such a way as to damage the desiccant particle. It has been found that this tightly bound moisture can be practically removed from the gel-type desiccant only by raising the temperature of the desiccant substantially above 300° F., and preferably to at least 350° F. It has been found, however, that if the gel-type desiccant is heated at high as 600° F.–650° F., its effectiveness as a desiccant is to a substantial extent permanently damaged. In fact, it has been found that in order to insure that the gel-type desiccant does not incur such heat damage during its revivification, it should not be heated above about 500° F. In view of the fact that some of the tightly bound moisture is still retained by the gel-type adsorbents even if heated to equilibrium conditions at 1400° F., it will be apparent that not all of the moisture should be removed from the adsorbent during the revivification process. It has been found that if in the second and rapid heating portion of the revivification process a suitable gel-type desiccant is heated to a temperature within the range 350° F. to about 500° F., a revivified gel-type desiccant having a very satisfactory moisture adsorption capacity may be obtained.

It has been found that during the first stage of the spent gel-type desiccant revivification when the loosely bound moisture is being removed, in order to prevent the excessive gradual break down of the gel structure which has been characteristic of prior art operations, the rate of desiccant heating should be so controlled that the rate of increase of desiccant temperature is broadly below about 50° F. per minute. For operations wherein the desiccant is to be revivified and reused a great number of times, it has been found that the rate of desiccant heating during the first stage of the revivification should preferably be limited below about 5° F. per minute in order to substantially eliminate gradual breakdown of desiccant structure due to the revivification operation.

The advantage of the improved method for gel-type desiccant revivification described herein may be understood from a consideration of the following examples:

*Example 1*

A column of ordinary granulated commercial brand silica gel desiccant made up of particles which had an average diameter of about 0.144 inch and all of which was retained on a 6 mesh Tyler screen was maintained in a suitable confined zone. Air at about 70° F. and having a relative humidity of about 80% was passed through the column of desiccant until the desiccant was substantially spent due to adsorbed moisture. Then the column of desiccant was heated in place from substantially atmospheric temperature to about 350° F. in about 3 minutes. The heating was accomplished by passing air preheated to 350° F. through the desiccant, the air also serving as a sweeping gas to carry out the released moisture. The desiccant was maintained at 350° F. for 20 minutes after reaching that temperature and then cooled to substantially atmospheric temperature. This cycle of operational steps was repeated about 300 times. After 300 such cycles, it was found that about 17% by weight of the desiccant particles would pass through the 6 mesh Tyler screen. Most of these particles were much smaller than 6 mesh.

*Example 2*

The same cycle of operation was repeated in the same confining vessel as described in Example 1, except that in this example a bead form gel-desiccant of the improved type mentioned hereinabove was employed. The average particle size of the original bead desiccant size was about 0.144" diameter and all of the particles were retained on a 6 mesh screen. After 300 cycles, however, about 9% by weight of the desiccant particles passed through 6 mesh Tyler screen.

*Example 3*

Employing the same type of desiccant employed in Example 1 in the same apparatus and repeating the cyclic operation of 300 cycles excepting that in the revivifying portion of the operation the spent desiccant is first heated at a rate just below 3° F. per minute until the temperature reaches 300° F., after which it is quickly heated to 350° F. and maintained at 350° F. for about 20 minutes, after 300 cycles only about 2% by weight of the desiccant particles will pass through a 6 mesh Tyler screen.

*Example 4*

Employing the preferred bead-type desiccant of the same type used in Example 2, and following the procedure of operation outlined in Example 3 for 300 cycles, after 300 cycles only about ½ percent by weight of the desiccant particles will pass through a 6 mesh Tyler screen.

From a comparison of results in Examples 1 and 3 and in Examples 2 and 4, it will be apparent that the method of this invention permits revivification of a gel-type desiccant while limiting the particle break down of the desiccant and the accumulation of objectionable undersized material or of fines to a minimum. It will be apparent that even when the particle-form desiccant is employed in a cycle, "desiccant in situ" type of operation the savings effected by the method of this invention in make up of new desiccant is quite high. This saving is even more noticeable in "moving bed" or "moving column" types of operation because in the latter types of operation the flowing gel-type desiccant particles are subjected to additional physical wear and tear due to their continuous movement. When the gel particle structure is weakened due to too rapid heating during the preliminary stages of the revivification step, the weakened gel particle is more readily susceptible to mechanical cracking and breakage as it moves through its endless path of travel. By substantially eliminating this particle weakening effect of too rapid heating during the early stage of the desiccant revivification a much sturdier and stronger gel particle is maintained in the system so that attrition losses due to its continuous movement are reduced to a minimum.

While this invention is considered to be broad to revivification of a fixed bed or column of adsorbent and to a moving bed or column of adsorbent, the preferred method of revivification is by means of a moving bed or column process. Such a preferred moving column process adapted for continuous dehumidification of gaseous materials is shown in the single drawing attached hereto.

Turning now to the drawing, there is shown in highly diagrammatic form a dehumidification vessel 10, a conveyor 11 and a revivification vessel 12 located above the vessel 10 and in solid flow communication therewith through conduit 13 bearing valve 15. A solid discharge conduit 16 bearing valve 17 is connected between the lower end of vessel 10 and conveyor 11 and a solid inlet duct 18 extends downwardly from the upper end of conveyor 11 to the upper end of vessel 12. A partition 19 defines a solid material surge chamber 20 in the upper end of vessel 12 and uniformly spaced tubes 21 depending from partition 19 provides a passage for solid flow from chamber 20 to the revivifying zone therebelow. A similar partition 22 defines a surge chamber 23 in the upper end of vessel 10 and uniformly spaced tubes 24 provide a passage for solid flow to the dehumidifying zone therebelow. A partition 26 having properly distributed orifices 27 therein is positioned in the lower section of vessel 12. A second partition 28 having a smaller number of dependent tubes 29 is spaced below partition 26. The arrangement is such that the streams of solid passing from orifices 27 are proportionately combined in the smaller number of streams passing through tubes 29 and these latter streams are proportionately combined into the single discharge stream in conduit 13 so as to insure substantially uniform withdrawal of solid material from all portions of the vessel cross-sectional area above partition 26. A similar arrangement of partitions 26' and 28' are provided in the lower section of vessel 10.

In operation, particle form gel-type adsorbent enters the dehumidification vessel through conduit 13 and passes downwardly therethrough as a substantially compact continuous column at a rate controlled by valve 17. Gas to be dehumidified, for example, air containing water vapor, is introduced through conduit 30 to manifold 31 from which it passes through a row of spaced pipes 32 (one being visible in the drawing) to a row of spaced distributing troughs 33 from which it is distributed into the column of desiccant. The trough 33 may take any of a number of forms, for example, inverted channels of angular cross-sectional shape. The air passes upwardly through the desiccant column countercurrently to the desiccant flow and is disengaged from the desiccant column in gas space 34 provided by tubes 24. Dehumidified air is withdrawn from space 34 through outlet conduit 35. The rates of desiccant and gas flow are so controlled by valves 17 and 36 respectively, as to provide either substantially bone dry air at outlet 35 or air of the desired reduced humidity. Inasmuch as a considerable amount of heat is released due to the adsorption of moisture on the gel-type desiccant, heat should preferably be removed from the dehumidification zone to maintain the desiccant temperature at a level at which its moisture adsorption capacity is high. This may be accomplished by passage of a suitable heat exchange fluid in indirect heat transfer relationship with the desiccant through uniformly spaced tubes 37 which are supplied through manifold 38 and inlet conduit 39 with the cooling fluid. Cooling fluid may be withdrawn from tubes 37 into outlet manifold 40 and from manifold 40 through conduit 41. Any suitable cooling fluid such as water and/or air may be employed in tube 37. Spent moisture laden desiccant is conveyed from vessel 10 via conveyor 11 which may be of any suitable construction, for example, a continuous bucket elevator or to the surge zone in vessel 12. The moisture laden desiccant enters the revivifying chamber 30 through tubes 21 and is slowly heated by indirect heat transfer with a suitable heat exchange fluid passed through uniformly spaced apart tubes arranged in banks such as banks 46, 47 and 48. Each bank of tubes, as shown, consists of two rows connected into a common inlet manifold and outlet manifold. Thus the banks 46, 47 and 48 are provided with separate inlet manifolds 49, 50 and 51 respectively and separate outlet manifolds 52, 53 and 54 respectively. The inlet and outlet manifolds may take the form of tube boxes extending substantially the width of the vessel 12. The inlet manifolds 49, 50 and 51 are provided with valve bearing inlet conduits 55, 56 and 57 respectively and the outlet manifolds 52, 53 and 54 are provided with valve bearing outlets 58, 59 and 60 respectively. The same heat exchange fluid may be provided to each tube bank, if desired, or in some operations heating fluid existing at different inlet temperatures may be independently supplied at controlled rates to each bank of tubes 46, 47 and 48. The total amount of heat transfer tubes provided in the section of vessel 12 occupied by banks 46, 47 and 48 and the temperature and rate of flow of heating fluid passed therethrough should be such that the temperature of the solid material passing through this section of the vessel rises at a rate less than 50° F. per minute and in preferable operation at a rate less than about 5° F. per minute. The factors of solid detention time in the zone occupied and controlled by the banks of tubes 46, 47 and 48 and the rate of heat input to the desiccant should be so controlled that the desiccant passing through this zone rises in temperature only within the above specified rate limits and such that substantially all of the loosely bound moisture has been removed from the desiccant passing from this zone. The desiccant then passes to a second heating zone in a lower portion of vessel 12 which is the zone occupied by the bank of tubes 66 supplied with heating fluid from conduit 61 through inlet manifold 62. Heating fluid passes from tubes 66 to manifold 63 from which it may be withdrawn through conduit 64. A heating fluid existing at a much higher temperature may be passed through tubes 66 than through the tubes in the first heating section. Thus the heating of the solid in the second heating zone may be at any desired high rate, for example 100° F. per minute. The heating fluids used in tubes 66 and in tubes 46, 47 and 48 may take a number of forms, for example hot water under pressure, heated steam, low melting point metallic alloys circulated through a closed system or low melting point mixtures of fused inorganic salts. As an example, low pressure steam existing near 212° F. may be passed through tube bank 46, while 175# gauge steam existing at about 370° F. may be passed through tube banks 47 and 48. At the same time a fused inorganic salt mixture existing at 600° F. and upwards may be circulated through tubes 66. Moisture released from the desiccant is withdrawn from the upper section of the vessel 12 through outlet 65. In most operations it is advantageous to pass a suitable sweeping gas through the desiccant column in the revivifying zone to help sweep out the released moisture. For example, air or flue gas may be introduced through inlet 70 to manifold 71 from which it passes through a row of tubes 72 under a row of spaced gas distributing members 73. The gas then passes upwardly through the column of desiccant and is withdrawn through outlet 65 along with released moisture. Since high rates of solid heating in the second stage of the desiccant revivification are not detrimental, it is usually desirable to take advantage of the high heat exchange rates obtainable by direct contact of the particle form desiccant with hot heat carrying gas in the second stage of the desiccant heating. For example, the sweeping gas introduced through outlet 70 may be heated prior to its introduction to a suitable temperature, for example, 350° F. or higher, so that the heat carried in said gas is transferred to the solid material at a very high rate in the zone 80 of vessel 12. With this type of operation, zone 80 may be utilized as the second heating zone in the desiccant revivification operation, thereby permitting the elimination of tubes 66 or permitting their use as part of the first heating zone. In the latter case, proper reduction in the temperature of the heating fluid introduced to tubes 66 shall be made to insure proper limitation of the rate of desiccant heating in the first heating stage. The sweeping and heat carrying gas employed may be any suitable gas which is substantially stable under the operating conditions involved and which does not react or become readily adsorbed on the desiccant under the revivification conditions. Air or flue gas are suitable sweeping gases. In the lower section of vessel 12 the revivified gel-type desiccant is cooled by passage of a suitable cooling fluid through tubes 81. Tubes 81 are supplied with cooling fluid from manifold 82 which is in turn supplied through inlet 83. Cooling fluid passes from tubes 81 to outlet manifold 84 from which it is withdrawn through outlet conduit 85. The desiccant after being cooled to a suitable temperature for the operation in vessel 10 is returned to vessel 10 through conduit 13.

In a typical operation of the continuous system described hereinabove, 80% humidity air existing at about 70° F. may be dehumidified to substantially bone dry air by passage through the dehumidification vessel 10 in contact with the improved bead form gel-type desiccant mentioned hereinabove. The gel to air throughput rates in this operation should be of the order of one pound of desiccant for every five cubic feet (standard) of air. The desiccant in vessel 10 is maintained near 70° F. by cooling. The spent desiccant may be slowly heated by banks of tubes 46, 47, 48 and 66 at a rate below about 5° F. per minute until the moisture content in the gel is below about 10% or preferably 8% by weight of the gel. Then the gel is rapidly heated to 350° F. in zone 80 by means of air introduced through inlet 70 at about 350–360° F. The gel is cooled by tubes 81 to about 70° F. and returned to vessel 10.

It should be understood that the details of apparatus construction and arrangement and the specific examples of operation conditions and of applications of this invention described hereinabove are intended as illustrative and are not to be construed as limiting the scope of this invention except as it may be limited by the following claims.

I claim:

1. The method for revivifying a particle-form inorganic gel adsorbent which has become spent as a desiccant by moisture adsorption thereon which method comprises: passing said spent inorganic gel adsorbent as a substantially compact column of downwardly moving particles through a first confined heating zone while passing a suitable heating fluid in indirect heat transfer relationship with said adsorbent under such conditions as to limit the rate of temperature rise of said adsorbent in said heating zone below about 50° F. per minute, withdrawing moisture released from said adsorbent from said zone, withdrawing said adsorbent from the lower section of said zone at a rate so controlled that the residence time of said adsorbent in said zone is sufficient to insure reduction of the moisture content of said adsorbent below about 10 per cent by weight of said adsorbent, passing said adsorbent through a second heating zone, while heating it therein at a substantially higher rate than in said first zone to remove additional moisture and separately withdrawing said additional moisture and said adsorbent from said second heating zone.

2. In a cyclic dehumidifying process wherein a particle form gel-type desiccant is repeatedly employed for removing moisture from a moisture containing gas and then revivified for reuse as a desiccant the method for revivifying the particle-form gel-type desiccant which has become spent in use which comprises: passing said desiccant as a substantially compact column of solid particles downwardly through a confined desorption zone while heating it by indirect heat transfer with a suitable heating fluid to drive off adsorbed moisture controlling the factors of detention time and rate of heat transfer to said desiccant in said zone such that the rate of increase of desiccant temperature as it moves through said zone is below about 5° F. per minute and such that the residual moisture on the desiccant passing from said zone is below 10 per cent by weight of said desiccant, and passing the gel-type desiccant from said zone through a second desorption zone wherein it is heated at a higher rate to remove additional moisture.

3. The method for revivifying a particle-form gel-type desiccant which has become spent in use which comprises: passing said desiccant as a substantially compact column of solid particles downwardly through a confined desorption zone while heating it by indirect heat transfer with a suitable heating fluid to drive off adsorbed moisture, controlling the factors of detention time and rate of heat transfer to said desiccant in said zone such that the rate of increase of desiccant temperature as it moves through said zone is below about 50° F. per minute and such that the temperature of the desiccant passing through said zone reaches a level within the range about 275° F. to 325° F., withdrawing moisture removed from said desiccant from said zone and passing said gel-type desiccant from said zone through a second desorption zone wherein it is heated at a substantially higher rate to a higher temperature which is below about 500° F. and withdrawing additional removed moisture from said second zone.

4. In a continuous cyclic dehumidifying process wherein a particle form gel-type desiccant is passed cyclically through a dehumidifying zone wherein it contacts a moisture containing gas to adsorb the moisture therefrom and then through a revivifying zone wherein the adsorbed moisture is removed from the desiccant the improved method for revivifying the spent particle-form gel-type desiccant which comprises: maintaining a substantially compact, continuous, confined column of particle-form solid gel-type desiccant, withdrawing revivified desiccant from the lower end of said column at a controlled rate, replenishing said column at its upper end with spent desiccant from the revivifying zone, passing a suitable heat exchange fluid in indirect heat transfer relationship with said desiccant in an upper portion of said column under such conditions as to heat said desiccant in said upper portion to a temperature within the range about 275° F. to 325° F. at a rate below about 5° F. temperature increase per minute, passing a suitable heat exchange fluid in indirect heat transfer relationship with said desiccant in a lower portion of said column to heat it to a higher temperature below about 500° F. at a substantially higher rate than in said upper portion, and withdrawing moisture released from said desiccant from said confined column.

5. The method for revivifying a spent particle-form gel-type desiccant which comprises: maintaining a substantially compact, continuous, confined column of particle-form solid gel-type desiccant, withdrawing revivified desiccant from the lower end of said column at a controlled rate, supplying spent particle form silica gel desiccant existing at a temperature substantially below the boiling point of water to the upper end of said column, passing a suitable heat exchange fluid in indirect heat transfer relationship with said desiccant in an upper portion of said column under such conditions as to heat said desiccant in said upper portion to a temperature within the range about 275° F. to 325° F. at a rate below about 50° F. temperature increase per minute, passing a separate heat exchange fluid in indirect heat transfer relationship with said desiccant in a lower portion of said column to heat it to a higher temperature below about 500° F. at a substantially higher rate than in said upper portion, passing a suitable sweeping gas through said upper and lower portions of said column to carry off the released moisture from said desiccant, and passing a suitable cooling fluid in heat exchange relationship with said desiccant in a still lower portion of said column to cool said desiccant to a temperature substantially below the boiling point of water.

6. A continuous cyclic process for dehumidifying air and the like which comprises: passing a particle-form solid inorganic gel adsorbent having a high capacity for moisture adsorption through a confined dehumidifying zone as a substantially compact column, continuously passing air to be dehumidified through said column in said zone at a controlled rate, while withdrawing heat from said adsorbent to maintain its temperature at a suitable level for air dehumidification and removing dehumidified air from said confined zone, passing the moisture laden adsorbent from said dehumidifying zone to a confined revivifying zone, passing said desiccant through said revivifying zone as a substantially compact, continuous column, passing a suitable heating fluid in indirect heat transfer relationship with said adsorbent in an upper portion of said revivifying zone under such conditions as to heat the adsorbent in said upper portion of said revivifying zone to a temperature within the range about 275° F. to 325° F. at a rate below about 5° F. temperature increase per minute, further heating said adsorbent to a higher temperature which is below 500° F. at a substantially higher rate of heating in a portion of said revivifying zone below said upper portion, passing a suitable sweeping gas through said column in said revivifying zone to carry out the moisture released from said desiccant in said revivifying zone, cooling the revivified adsorbent to a suitable temperature for use in dehumidifying air and returning the cooled dehumidified adsorbent to said dehumidifying zone.

7. A continuous cyclic process for dehumidifying air and the like which comprises: passing a particle-form solid inorganic gel adsorbent having a high capacity for moisture adsorption through a cofined dehumidifying zone as a substantially compact column, continuously passing air to be dehumidified through said column in said zone at a controlled rate and removing dehumidified gas from said confined zone, passing the moisture laden desiccant from said dehumidifying zone to a first confined heating zone, passing said desiccant at a controlled rate through said heating zone as a substantially compact column, passing a heating fluid in indirect heat transfer relationship with said desiccant in said heating zone, controlling the factor of detention time of said desiccant in said heating zone and the rate of heat input to said desiccant so that said temperature of said desiccant passing through said heating zone increases at a rate less than about 5° F. per minute and such that the moisture content of the desiccant passing from said first heating zone is below about 10 per cent by weight of said desiccant, passing said desiccant through a second heating zone while heating it therein at a substantially higher rate to remove additional moisture from said desiccant, passing said desiccant from said second heating zone through a cooling zone while cooling it therein to a suitable temperature for dehumidification of said gas in said dehumidifying zone and passing the cooled, revivified desiccant to said dehumidifying zone.

8. The method for revivifying a spent particle-form gel-type desiccant which comprises: maintaining a substantially compact, continuous, confined column of particle-form solid gel-type desiccant, withdrawing revivified desiccant from the lower end of said column at a controlled rate, replenishing said column at its upper end with spent desiccant, passing a suitable heat exchange fluid in indirect heat transfer relationship with said desiccant in an upper portion of said column under such conditions as to heat said desiccant in said upper portion to a temperature within the range about 275° F. to 325° F. at a rate below about 50° F. temperature increase per minute, introducing a heated sweeping gas into said column at a level below said upper portion and passing said gas upwardly through said column so as to rapidly heat the desiccant in a portion of said column below said upper portion to a substantially higher temperature so as to remove additional moisture from said desiccant, withdrawing said sweeping gas and said moisture from said column at a level above said upper portion wherein said indirect heat transfer from a heat exchange fluid is provided.

9. In a cyclic process for removal of moisture from a moisture containing gas wherein a particle-form inorganic gel desiccant is repeatedly subjected to alternate contacting with a moisture containing gas at a temperature suitable for effecting adsorption of the moisture on the desiccant and to moisture removal by heating the improved method for repeatedly effecting said moisture removal without gradual breakage of the desiccant particles which comprises, increasing the temperature of said desiccant by heating at a rate of less than about 5° F. per minute to a temperature within the range about 275–325° F., whereby the freely bound moisture is removed from the desiccant, then heating the desiccant at a substantially higher rate to a temperature within the range 350–500° F., whereby further moisture is removed and discontinuing the heating in time to prevent the desiccant temperature from rising above 500° F.

10. In a process wherein an inorganic oxide gel desiccant is repeatedly subjected in cycle to alternate contacting with a moisture containing gas under conditions controlled to effect adsorption of the moisture onto said desiccant and then heating to remove the desiccant, the improvement comprising, controlling the rate of said heating to effect a gradual increase in the desiccant temperature above its temperature during the contact with the moisture containing gas, said increase in temperature being limited to a rate less than about 5° F. rise per minute until the residual moisture content of said desiccant falls below about 10 percent by weight of the desiccant, and further heating said desiccant at a substantially higher rate than 5° F. increase per minute to a temperature above about 300° F. but below about 500° F.

11. A continuous cyclic process for dehumidifying a moisture containing gas which comprises, passing a particle form inorganic gel desiccant cyclically through a dehumidifying zone, a drying zone and a cooling zone, passing the moisture containing gas into contact with the desiccant in the dehumidifying zone while maintaining the temperature suitable for effecting adsorption of the moisture from said gas by said desiccant, withdrawing the dehumidified gas from said zone, heating the desiccant in said drying zone to increase its temperature and drive off adsorbed moisture, measuring the residual moisture content of the desiccant during the heating and controlling the heating to limit the rate of temperature increase to less than 5° F. per minute until the measured moisture content of said desiccant falls below about 8 percent by weight, withdrawing removed moisture from said drying zone as a vapor, stopping the heating and cooling the desiccant before its temperature reaches 500° F.

12. In a process wherein an inorganic gel desiccant is subjected in repeated cycles to a moisture containing atmosphere under conditions controlled to effect adsorption of the moisture by the desiccant and then to heating to effect the removal of the adsorbed moisture from the desiccant the improvement which comprises: controlling said heating of said desiccant so as to cause its temperature to rise at a rate of less than about 5° F. per minute until substantially all the loosely bound moisture has been removed, then heating said desiccant at a substantially higher rate to remove additional moisture therefrom.

13. In a continuous cyclic process for removal of moisture from a moisture containing gas wherein a particle form inorganic oxide gel desiccant is cyclically contacted with said moisture containing gas at substantially atmospheric temperature in a confined dehumidifying zone to remove moisture from said gas by adsorption and is then heated in a drying zone to effect removal of the moisture, the improvement which comprises, heating the moisture containing desiccant in said drying zone to a temperature within the range 275–325° F. at a rate of less than about 5° F. temperature increase per minute, whereby the loosely bound moisture is removed from said desiccant, further heating said desiccant at a substantially higher rate to a substantially higher temperature which is below 500° F. to effect further removal of moisture from the desiccant, and cooling the desiccant to substantially atmospheric temperature for reuse in said dehumidifying zone.

14. In a process wherein an inorganic gel desiccant is subjected in repeated cycles to a moisture containing atmosphere under conditions controlled to effect adsorption of the moisture by the desiccant and then to heating to effect the removal of the adsorbed moisture from the desiccant the improvement which comprises: heating said desiccant to increase the temperature and remove moisture, measuring the residual moisture content of the desiccant during its temperature rise and controlling the heating to limit the rate of temperature increase to less than about 5° F. increase per minute until the residual moisture content of said desiccant is less than about 8 percent by weight, and stopping the heating of said desiccant in time to prevent its temperature from reaching 500° F.

15. A cyclic process for removing moisture from moisture containing gases which comprises, contacting the moisture containing gas with a particle form inorganic oxide gel desiccant at substantially atmospheric temperature to effect adsorption of the moisture in said gas on the desiccant, thereby dehumidifying the gas, discontinuing contact between said gas and the desiccant when the desiccant has become substantially spent and increasing the temperature of said adsorbent by controlled heating at a rate of less than about 5° F. increase per minute until the moisture content of the desiccant has been reduced to less than about 8 percent by weight, then heating said desiccant to a higher temperature which is above 350° F. and below 500° F. to remove additional moisture and finally cooling the desiccant to substantially atmospheric temperature to ready it for reuse.

16. In a cyclic process wherein a particle form inorganic oxide gel desiccant is subjected as a substantially compact column to repeated alternate contactings with a moisture containing gas to effect the dehumidification of said gas and to moisture removing revivifications for reuse as a dehumidifying agent the improved method of repeatedly revivifying said desiccant without causing gradual break down in its structure which comprises: passing a suitable heating fluid in indirect heat transfer relationship with said column of gel-type desiccant under such controlled conditions as to limit the rate of temperature rise of said desiccant below about 5° F. per minute until the moisture content on said desiccant is less than about 10 percent by weight thereof and then passing a heat exchange fluid in indirect heat transfer relationship with said column under such conditions as to raise the temperature of said desiccant at a substantially higher rate to a level above about 300° F. and below 500° F., while passing a suitable sweeping gas through said heated column.

CHARLES H. LECHTHALER.

REFERENCES CITED

The following references are of record in the file of this patent:

UNITED STATES PATENTS

| Number | Name | Date |
| --- | --- | --- |
| 731,682 | Hillig | June 23, 1903 |
| 1,297,724 | Patrick | Mar. 18, 1919 |
| 1,422,007 | Soddy | July 4, 1922 |
| 1,577,534 | Miller | Mar. 23, 1926 |
| 1,617,960 | Muller | Feb. 15, 1927 |
| 1,825,707 | Wagner | Oct. 6, 1931 |
| 1,952,406 | Barstow | Mar. 27, 1934 |
| 2,273,350 | Fry et al. | Feb. 17, 1942 |
| 2,384,942 | Marisic | Sept. 18, 1945 |
| 2,409,263 | Ewing et al. | Oct. 15, 1946 |
| 2,432,822 | Secor | Dec. 16, 1947 |
| 2,434,419 | Laughlin | Jan. 13, 1948 |